United States Patent
Hanumanthan et al.

(10) Patent No.: US 9,341,072 B2
(45) Date of Patent: May 17, 2016

(54) SEAL BETWEEN STATIC TURBINE PARTS

(71) Applicant: ALSTOM Technology Ltd, Baden (CH)

(72) Inventors: Hariharan Hanumanthan, Chennai (IN); Christos Georgakis, Leicester (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 14/574,803

(22) Filed: Dec. 18, 2014

(65) Prior Publication Data

US 2015/0102566 A1 Apr. 16, 2015

Related U.S. Application Data

(63) Continuation of application No. PCT/EP2013/062509, filed on Jun. 17, 2013.

(30) Foreign Application Priority Data

Jun. 18, 2012 (EP) ..................................... 12172408

(51) Int. Cl.
*F01D 11/00* (2006.01)
*F02C 7/28* (2006.01)
(Continued)

(52) U.S. Cl.
CPC ................ *F01D 11/005* (2013.01); *F02C 7/28* (2013.01); *F16J 3/047* (2013.01); *F16J 15/0887* (2013.01); *F05D 2240/11* (2013.01); *F05D 2240/57* (2013.01)

(58) Field of Classification Search
CPC .......... F02C 7/28; F16J 3/047; F16J 15/0087; F16J 15/061; F01D 11/005; F05D 2240/11; F05D 2240/57

USPC ............... 277/637, 626, 644; 415/135, 174.5, 415/134, 139
See application file for complete search history.

(56) References Cited

U.S. PATENT DOCUMENTS 2,908,519 A * 10/1959 Holden ............... F16C 11/0657
184/109
4,537,024 A * 8/1985 Grosjean ............... F01D 11/005
415/139

(Continued)

FOREIGN PATENT DOCUMENTS

| CN | 1459003 A | 11/2003 |
| CN | 1657807 A | 8/2005 |

(Continued)

OTHER PUBLICATIONS

Office Action (First) issued on Sep. 25, 2015, by the State Intellectual Property Office of the People's Republic of China in corresponding Chinese Patent Application No. 201380031949.1 and an English translation of the Office Action. (8 pgs).

*Primary Examiner* — Kristina Fulton
*Assistant Examiner* — Nathan Cumar
(74) *Attorney, Agent, or Firm* — Buchanan Ingersoll & Rooney PC

(57) ABSTRACT

The invention relates to a seal between static components of a turbine. The seal includes at least one middle piece, which has at its opposite ends end pieces. The end pieces are arranged in a respective groove of the static components and adjoining the inside surfaces of the grooves. The middle piece has at least two parts. The middle piece parts are rotatably coupled to one another via a pivot. The pivot is an annular ring in cross section formed by at least two cylinder elements being coaxially interfitted and slidable relative to each other. The inner surface of the pivot is wrapped with metallic cloth material. Advantages of the invention are higher flexibility due to the pivoting to accommodate larger relative movements of the turbine components and reduced wear with aging while maintaining good sealing performance.

6 Claims, 2 Drawing Sheets

(51) Int. Cl.
*F16J 15/08* (2006.01)
*F16J 3/04* (2006.01)

(56) References Cited

U.S. PATENT DOCUMENTS

| | | | |
|---|---|---|---|
| 4,575,099 A | 3/1986 | Nash | |
| 5,158,305 A * | 10/1992 | Halling | F16L 17/06 277/591 |
| 5,586,773 A * | 12/1996 | Bagepalli et al. | F16J 15/122 277/650 |
| 5,743,708 A | 4/1998 | Cunha et al. | |
| 5,868,398 A | 2/1999 | Maier et al. | |
| 6,431,825 B1 | 8/2002 | McLean | |
| 7,222,861 B2 | 5/2007 | Gittler | |
| 7,530,233 B2 | 5/2009 | Milazar | |
| 7,744,096 B2 | 6/2010 | Kono | |
| 2004/0094901 A1 | 5/2004 | Gittler | |
| 2005/0008473 A1 * | 1/2005 | Balsdon | F01D 11/005 415/110 |
| 2005/0179215 A1 | 8/2005 | Kono | |
| 2007/0025841 A1 * | 2/2007 | Milazar | F01D 11/005 415/134 |
| 2007/0297900 A1 | 12/2007 | Abgrall et al. | |
| 2009/0053055 A1 | 2/2009 | Cornett et al. | |

FOREIGN PATENT DOCUMENTS

| | | | |
|---|---|---|---|
| CN | 1853032 A | 10/2006 | |
| EP | 2 530 251 A2 | 12/2012 | |
| FR | 2 875 851 A1 | 3/2006 | |
| JP | 2005 016324 A * | 1/2005 | F01D 25/24 |
| JP | 2005016324 A | 1/2005 | |

* cited by examiner

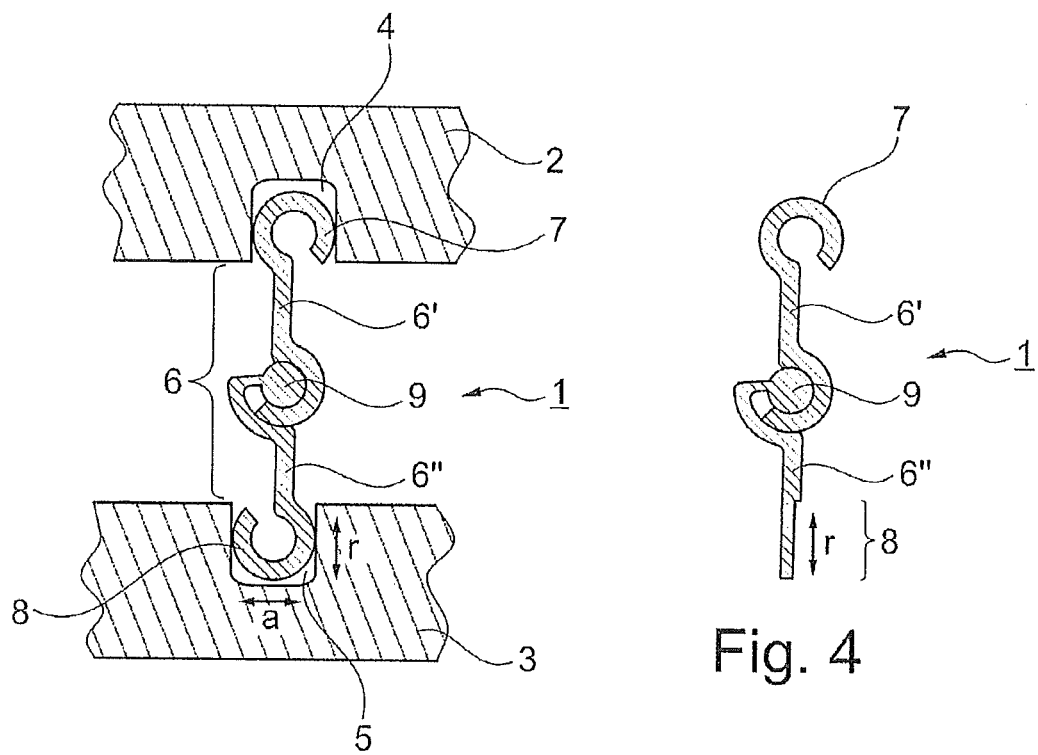
Fig. 3
Fig. 4
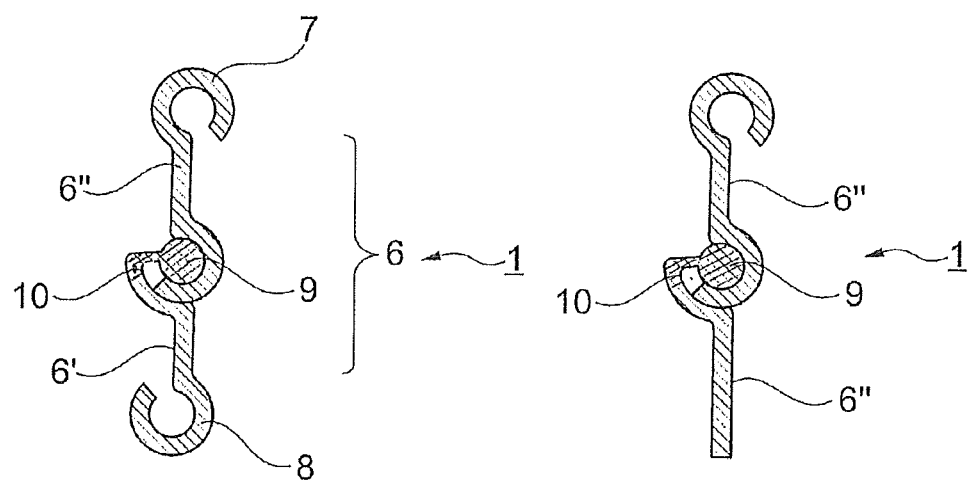
Fig. 5
Fig. 6

SEAL BETWEEN STATIC TURBINE PARTS

CROSS-REFERENCE TO RELATED APPLICATIONS

This application claims priority to PCT/EP2013/062509 filed Jun. 17, 2013, which claims priority to European application 12172408.2 filed Jun. 18, 2012, both of which are hereby incorporated in their entireties.

TECHNICAL FIELD

The invention relates to a seal between static components of a turbine. It relates in particular to a so-called "dog bone seal", which consists of a middle piece that has a respective bulge on two opposite sides, the bulges being arranged so as to bear tightly in grooves in the static components.

BACKGROUND

Such seals are well known for example in the field of gas turbines. The seals are used for sealing between static components of a turbine respective at the interfaces of turbine components, for example for sealing cooling-air paths in guide blades, for sealing between the individual segments of a guide blade row or as a circumferential seal between a casing part of the turbine and a guide blade row or for sealing component interfaces between the combustor and the turbine.

This type of seal is described, for example, in U.S. Pat. No. 5,743,708 and is shown there in particular with respect to FIGS. 17 and 18. The seal there consists only of a single part, this is a flat metallic piece, which has a respective solid bulge on two opposite sides. As viewed in the cross section, the seal has a long narrow centre piece, which has a round bulge at each of its ends. On account of its cross-sectional shape, it is referred to as a "dog bone seal". It is arranged there at the first guide blade row in each case between adjacent guide blade platforms and serves there to seal cooling-air paths for the purpose of cooling the outer and inner platforms of the guide blades.

The solid, round bulges are each arranged in a groove of adjacent guide blade platforms, in the course of which they bear tightly against the inner surfaces of the groove. The seals extend in each case over a side length of a platform. The seal is mainly brought about by a pressure difference, the seal being obtained along lines on the side surfaces of the groove, where the rounded bulges touch the flat insides of the grooves. In this case, the seal has to be ensured by the bulges in both grooves.

This typical conventional dog bone seal has a robust design, but unfortunately only a low flexibility to relative axial/radial movements of the turbine components. Furthermore, it has as additional disadvantages excessive wear in some occasions and degradation of sealing performance with aging (increased leakage to aging of the seal itself).

A variant of this dog bone seal type is disclosed in U.S. Pat. No. 5,868,398. It also serves here to seal between adjacent guide blade segments. However, the bulge at the sides of the seal is not of solid design, but rather is realized by a curvature of the flat metallic piece, the curved parts are set into a groove.

This seal has also the disadvantage that, in the event of an inadequate pressure difference, the bulges do not bear sufficiently tightly and leakage results. Furthermore, the seal is not fully ensured if one or both static parts of the turbine shift axially or radially and the grooves shift relative to each other, that means the seal is not flexible enough.

An improved seal between two static turbine parts is known from U.S. Pat. No. 6,431,825 B1. This seal does not depend on the level of a pressure differential. It is provided with a carrier piece comprising a flat metal piece with a middle piece and end pieces each of which is arranged in a groove in the static turbine parts. A second part comprising also a flat metal piece and having a middle piece and end pieces, which are also arranged in the grooves is attached to the middle piece of the carrier. The end pieces are constructed resiliently, ensuring a sealing contact between the end pieces and the inside surfaces of the grooves even in case of a relative shift off the grooves.

In addition, flexible seals for sealing between static turbine components of different types are known, for example membrane seals or cloth seals, but such seals are not are very robust.

Document EP 2 530 251 A2 describes a hinge seal to absorb different thermal growth of vessels. The hinge seal comprises a middle piano hinge portion which flexes, curves and/or flattens in case there is a relative translation between the vessels.

Document US 2005/0179215 A1 describes a a seal device in form of a "dog-bone" consisting of a plurality of seal strips fabricated from sheet material and connected via at least a connection rod or connection bar, which is inserted into through holes in the strips before the both rod ends are welded to the seal strips. This connection rod makes layers of seal strips to be joined at both ends in order to form a joint section.

SUMMARY

It is an object of the present invention to disclose a robust seal of the dog bone type for sealing between static components especially for turbines, which has—compared with the known state of the art dog bone seals—a higher flexibility with respect to relative movement of the turbine components and to fit better with the engine architecture. Furthermore, it should reduce the wear with aging and maintains a good sealing performance during operation.

This and other objects are obtained by a seal according to claim 1 of the present invention.

The described seal between static parts/components of a turbine, is a seal from the dog bone type. The seal consists of at least one middle piece, which has at its opposite ends end pieces, wherein the end pieces being arranged in a respective groove of the static parts/components and adjoining the inside surfaces of the grooves. The middle piece of the seal consists of at least two parts that are rotatably coupled to one another via a pivot, while a conventional dog bone seal consists of a middle piece, which is a long flat narrow metal piece in the cross section. The invention is characterized in that the pivot is an annular ring in cross section formed by at least two cylinder elements being coaxially interfitted and slidable relative to each other and that the inner part of said pivot is swrapped with metallic cloth material.

It is an advantage of the disclosed seal with such an adaptive dog bone design that it offers higher flexibility at turbine component interfaces to accommodate large relative movements between the components during engine operation because of the two individual rotable parts of the middle piece. In addition, wear with aging is reduced and a good sealing performance is maintained. The metallic cloth material avoids any leakage between the seal itself and the turbine component.

According to a first embodiment said end pieces are solid round bulges. This is a very robust design.

According to a second embodiment of the seal at least one of said end pieces has a round resilient hook shape. The resilient characteristic of the end pieces causes the latter to be force-fitted against the surfaces of the grooves, resulting in a seal along contact line between the end pieces and the grooves. The forced contact and seal are substantially independent on the pressure difference.

According to another embodiment both of said end pieces of the seal have a round resilient hook shape wherein the hooks are bent in the opposite direction.

As an alternative the seal has a second end piece with a straight fixed end. In an additional embodiment the second end piece has a straight sliding end which allows to maintain a good sealing performance even in case of a high movement of one of the components.

BRIEF DESCRIPTION OF THE DRAWINGS

The present invention is now to be explained more closely by means of preferred embodiments and with reference to the attached drawings, in which:

FIG. 3 shows a cross section of a second embodiment of the invention;

FIG. 4 shows a cross section of a third embodiment of the invention;

FIG. 5 shows a cross section of a fourth embodiment of the invention and

FIG. 6 shows a cross section of a fifth embodiment of the invention.

The same technical features are designated with the same reference numerals in all figures.

DETAILED DESCRIPTION

The present invention refers to a seal between static components of a turbine. It relates in particular to a so-called "dog bone seal", which is known from the prior art and for which an adaptive design is proposed.

Figure 1:
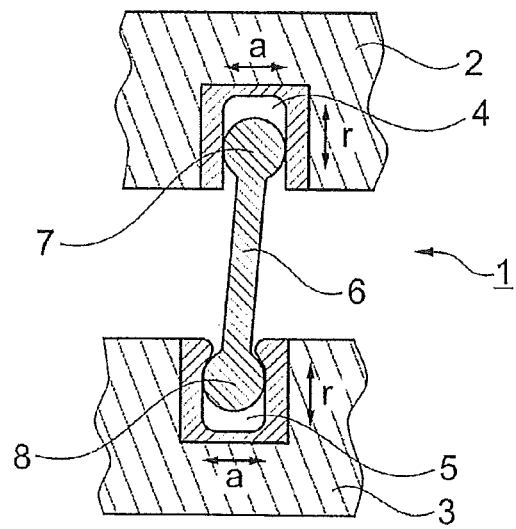
FIG. 1 shows schematically a cross section of a typical dog bone design known from the state of the art.

FIG. 1 shows schematically a cross section of a typical dog bone seal design known from the state of the art in the field of turbines. This dog bone seal 1 consists of a flat metallic middle piece 6, which has a respective solid round bulge as an end piece 7, 8 on its two opposite ends. It is arranged between adjacent static components 2, 3 of the turbine, for example adjacent guide blade platforms and serves there to seal cooling-air paths for the purpose of cooling the outer and inner platforms of the guide blades.

The solid, round bulges 7, 8 are each arranged in a groove 4, 5 of adjacent guide blade platforms, in the course of which they bear tightly against the inner surfaces of the groove 4, 5.

This typical conventional dog bone seal has a robust design, but unfortunately only a low flexibility to relative axial/radial movements (as shown by the arrows a, r in FIG. 1) of the turbine components 2, 3. Furthermore, it has as additional disadvantages excessive wear in some occasions and degradation of sealing performance with aging (increased leakage to aging of the seal itself).

Figure 2:
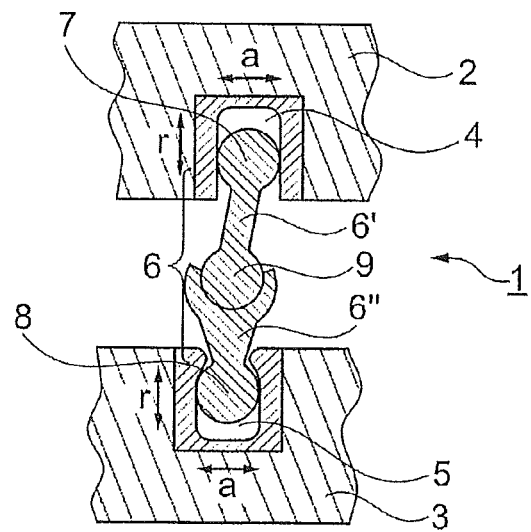
FIG. 2 shows a cross section of a first embodiment of the invention.

FIG. 2 shows a cross section of a first embodiment of the invention. In contrast to the seal according to FIG. 1 (prior art) the seal 1 in FIG. 2 consists of a different middle piece 6. According to the invention the middle piece 6 of the seal 1 consists of at least two parts 6', 6", which are connected via a pivot 9. The pivot 9 is an annular ring as indicated in the drawings. It is kind of two circular cylinders that are in form of a ring. The inner part of the pivot is wrapped with metallic cloth material.

The middle pieces 6', 6" according to that first embodiment of the invention have also a respective solid bulge 7, 8 on their opposite ends, the bulges 7, 8 being arranged so as to bear tightly in the opposite grooves 4, 5 in the static components 2, 3. This is an also a robust design.

Due to pivoting large relative movements of the turbine components during engine operation can be accommodated so that the seal of the present disclosure offers higher flexibility at turbine component interfaces. For example, component interfaces between the combustor and the gas turbine like high pressure turbine or low pressure turbine are suitable locations for application of the seal according to the invention. Furthermore, wear with aging will be reduced and a good sealing performance will be maintained. The adaptive seal reduces the leakage to the hot gas path, whist allowing the relative movement of the turbine components, and this will result in improving the turbine efficiency.

A second embodiment of the present invention is shown in FIG. 3. It differs from the first embodiment (see in FIG. 2) in that the end pieces 7, 8 of both middle pieces 6', 6", which are each arranged in the grooves 4, 5 of the components 2, 3 have a round resilient hook shape (rounded end) and that the shape of the pivot 9 is different. The hooks (=end pieces 7, 8) are bent in the opposite direction. The pivot 9 forms the sliding and rotational arrangement as of two annular cylinders that are supported by thin flexible arms connected to the adjacent component grooves. The resilient characteristic of the end pieces 7, 8 causes the latter to be force-fitted against the surfaces of the grooves 4, 5, resulting in a seal along contact line between the end pieces 7, 8 and the grooves 4, 5. The forced contact and seal are substantially independent on the pressure difference.

FIG. 4 shows a third embodiment of the invention. It differs from FIG. 3 in that the seal 1 here comprises a second end piece 8 of the middle piece part 6" with a straight sliding end. This technical solution is especially useful in case there is a very high radial movement of one of the components 2, 3, because the sealing performance could be maintained easily.

In an additional embodiment (see FIG. 6) the second end piece 8 of the middle piece part 6" has a straight fixed end.

FIG. 5 and FIG. 6 show embodiments, in which a metallic cloth material 10 is wrapped at the ends of the dog bone seal (the inner part of the pivot 9 is wrapped with the metallic cloth material 10) to avoid any leakage between the seal 1 itself and the turbine component grooves 4, 5.

The seal according to the invention can be used for example in gas turbines for gas turbine upgrades in service and for future gas turbine development, but also in steam turbines or any other engines, where a flexible sealing is desired.

While the invention has been described in detail with reference to exemplary embodiments thereof, it will be apparent to one skilled in the art that various changes can be made, and equivalents employed, without departing from the scope of the invention.

The invention claimed is:

1. An annular seal for arrangement between static components of a turbine, the seal comprising:
    a first middle piece having at one end of the first middle piece, a first end piece configured to be arranged in a groove of a respective static component and at another end the first middle piece, opposite the one end of the first middle piece, a first pivot piece, the first pivot piece being a solid round piece;

a second middle piece having at one end of the second middle piece a second end piece configured to be arranged in another groove of a respective static component and at another end of the second middle piece, opposite the one end of the second middle piece, a second pivot piece coaxially inner fit with the first pivot piece, the second pivot piece being a partial cylinder in a cross-section cut parallel to an axial direction of the annular seal, the second pivot piece coaxially inner fit with the first pivot piece, wherein the first pivot piece and the second pivot piece are configured to be slidable relative to each other; and a metallic cloth arranged between a surface of the first pivot piece and a surface of the second pivot piece.

2. The seal according to claim 1, wherein said end pieces are solid round bulges.

3. The seal according to claim 1, wherein at least one of said end pieces has a round resilient hook shape.

4. The seal according to claim 3, wherein both of said end pieces have a round resilient hook shape wherein the hooks are bent in the opposite direction.

5. The seal according to claim 3, wherein the second end piece has a straight fixed end.

6. The seal according to claim 3, wherein the second end piece has a straight sliding end.

* * * * *